Patented Dec. 18, 1951

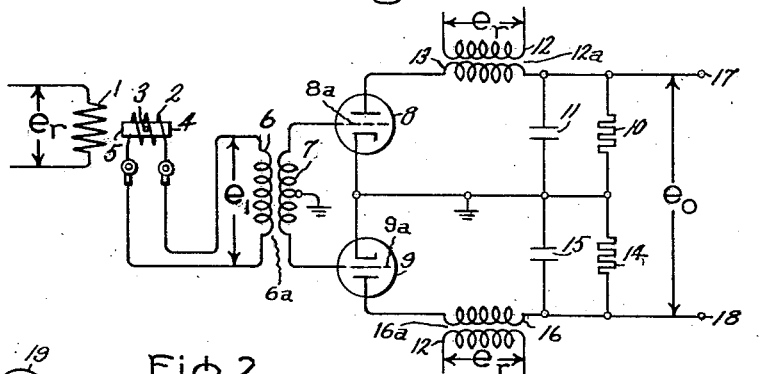
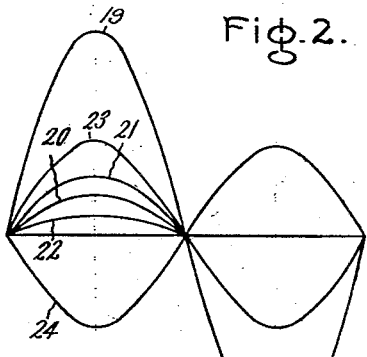
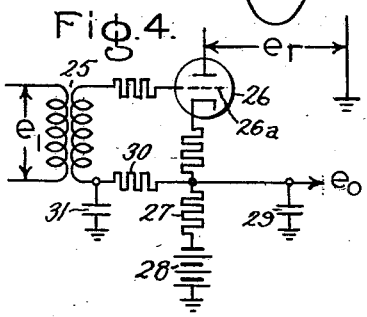
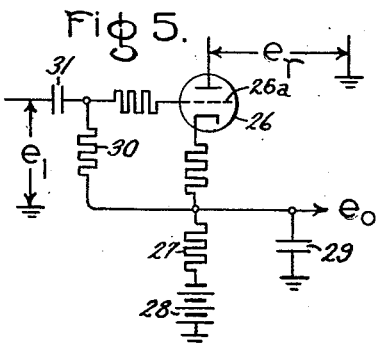
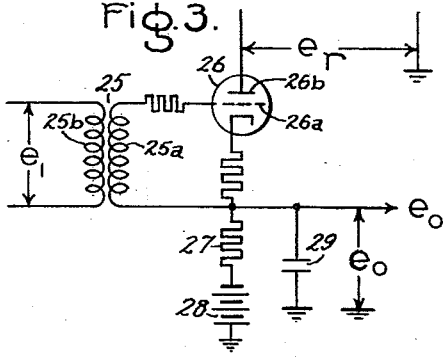
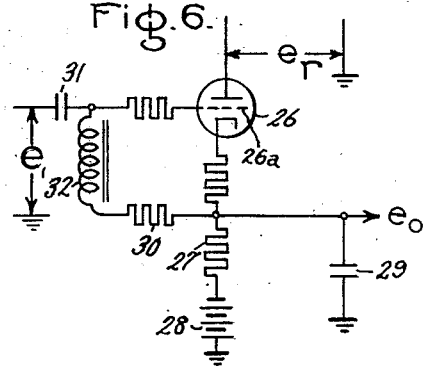
Inventor:
Arthur P. Adamson,
by
His Attorney.

2,579,286

UNITED STATES PATENT OFFICE 2,579,286

DISCRIMINATOR CIRCUIT

Arthur P. Adamson, Ballston Spa, N. Y., assignor to General Electric Company, a corporation of New York Application September 21, 1949, Serial No. 116,943

4 Claims. (Cl. 250—27)

My invention relates to discriminator circuits for detecting the magnitude and phase relationship of voltages in servo-control systems.

In discriminator circuits used with servo-control systems, a modulated alternating voltage, either in phase or 180° out of phase with an alternating reference voltage, is converted into a direct-current voltage. The magnitude of the direct-current output voltage is proportional to the magnitude of the alternating input voltage, and the polarity of the output voltage, with respect to one of the output terminals, depends on the phase relationship between the input voltage and the reference voltage. In the discriminator circuit commonly used with servo-control systems, one or more transformers are required and, in addition, since neither of the output terminals can be grounded, the output voltage is not taken with respect to ground. Thus, two lead wires are required to transmit the output voltage. Where space is a limiting factor, it is advantageous to eliminate the transformers and to reduce the number of lead wires required.

It is an object of my invention to provide a discriminator circuit without transformers, and utilizing single lead wires on both the input and output connections.

It is another object of my invention to provide a discriminator circuit having a variable gain and a wide range of frequency response characteristics.

It is a further object of my invention to provide a discriminator circuit having a large output voltage with moderate supply voltages.

It is a still further object of my invention to provide a discriminator circuit in which a minimum of equipment is required.

In carrying out my invention in one form thereof, I provide a discriminator circuit utilizing a single electron discharge device and having a load resistance, a direct current voltage and an alternating reference voltage electrically connected in series therewith. The cathode of the device is connected to ground through a series arrangement of a direct current voltage source and a load resistance. The output voltage is fed back through a resistance and capacitor or other suitable combination of impedances and the magnitude of the gain depends on the frequency of variation of the output voltage and the magnitude of the resistance and capacitor.

The features of my invention which I believe to be novel, are set forth with particularity in the appended claims. My invention itself, however, both as to its organization and method of operation, together with further objects and advantages thereof, may be best understood by reference to the following description taken in connection with the accompanying drawing in which Fig. 1 is an illustration of the ordinary type of discriminator circuit connected to an apparatus used in producing an input voltage. Fig. 2 illustrates the relationship between the input voltage $e_i$, the output voltage $e_o$, and the plate currents in the discriminator circuit of Fig. 1. Fig. 3 is a schematic diagram of the circuit of my invention without gain control, and Figs. 4, 5, and 6 illustrate gain control arrangements therefor.

Referring particularly to Fig. 1 there is shown the apparatus used in producing the input voltage $e_i$ which comprises a stator winding 1, connected across a source of alternating voltage designated as the reference voltage $e_r$, and a rotor winding 2 which rotates about an axis 3. The ends of the rotor are designated by numbers 4 and 5. The discriminator circuit commonly used with servo-control systems, also shown in Fig. 1, has a primary transformer winding 6, the terminals of which are connected to the rotor winding 2. The secondary winding 7 of the transformer 6a supplies the input voltage $e_i$ to the control electrodes 8a, 9a of a pair of electron discharge devices 8 and 9. Since the center point of the secondary winding 7 is grounded, the control electrode voltages of tubes 8 and 9 are 180° out of phase. The plate circuit of tube 8 comprises a parallel combination of resistance 10 and capacitor 11, the parallel combination being in series with the secondary winding 13 of a transformer 12a which has the alternating reference voltage connected across its primary winding 12. Similarly, the plate circuit of device 9 comprises a parallel combination of resistance 14 and capacitor 15, in series with secondary winding 16 of transformer 16a. The secondary windings 13, 16 are connected in the anode circuits in such a manner that the anode voltages of devices 8 and 9 are in phase. It is to be noted that the output voltage $e_o$ is taken across the resistances 10 and 14.

In Fig. 2, curve 19 is the reference voltage plotted as a function of time. Curve 20 represents the plate current in each device with zero input signal $e_i$, while curves 21 and 22 show the anode current in devices 8 and 9, respectively, when the voltage of curve 23 is impressed on the control electrode 8a of device 8 and the voltage of curve 24 is impressed on the control electrode 9a of device 9.

Fig. 3 shows the circuit of my invention without gain control comprising an input transformer 25, the secondary winding 25a of which has its terminals connected respectively to the control electrode 26a of an electron discharge device 26 and the upper terminal of a resistance 27. The cathode of device 26 is connected to ground through the resistance 27 and a direct current voltage source 28. The output voltage $e_o$ is taken between the upper terminal of the resistance 27 and ground. The reference voltage $e_r$ is connected in the anode circuit between the anode 26b of device 26 and ground. The primary winding 25b of transformer 25 is electrically connected to the rotor winding 2 shown in Fig. 1. A capacitor 29 serves to by-pass to ground the alternating component of the voltage across resistance 27, thus serving the same purpose as capacitors 11 and 15 in Fig. 1.

Fig. 4 is a modification of the discriminator circuit of Fig. 3 and includes a feedback circuit comprising a resistor 30 and capacitor 31. The alternating current components, in addition to being by-passed through capacitor 29, are also by-passed through the feedback resistor 30 and capacitor 31. By proper selection of the values of resistor 30 and capacitor 31 the voltage drop across resistance 30 may be controlled, thereby giving the circuit shown in Fig. 4 the advantage of gain control not present in the circuit of Fig. 3.

Where the use of an input transformer is undesirable, the circuit of Fig. 5 may be used in which the feed-back elements comprising the resistance 30 and capacitor 31 are connected to ground through the input voltage source $e_i$. The values of resistance 30 and capacitor 31 in Fig. 5 however, are somewhat limited since they must always be of substantial size for proper transmission of the input voltage $e_i$. In practice, this sometimes means that the gain for rapidly changing input voltages is less than is desired. For such cases the circuit of Fig. 6 may be used in which a choke 32 is connected between the feedback resistance 30 and the capacitor 31, providing a high impedance path for the input voltage $e_i$.

In Fig. 1, illustrating the generation of the input voltage $e_i$, the magnitude of the input voltage depends on the flux of the stator 1 which links the rotor winding 2. The input voltage $e_i$ will be in phase or 180° out of phase with the reference voltage, depending on the position of the rotor ends 4 and 5 with respect to the axis of rotation 3. When the end 4 of the rotor is above the axis of rotation 3, the input voltage $e_i$ is in phase with the reference voltage $e_r$ and when the end 4 of the rotor is below the axis of rotation 3, the input voltage $e_i$ will be 180° out of phase with the reference voltage.

Assuming, in the circuit illustrated in Fig. 1, that the input voltage $e_i$ is zero, current flows through devices 8 and 9 only when the reference voltage is positive. The capacitors 11 and 15 filter or remove the alternating current components from the voltages across resistances 10 and 14, and hence, the voltages across resistances 10 and 14 are only the direct current components of the pulsating voltages. As a result, terminals 17 and 18 are negative with respect to ground. The output voltage $e_o$ obtained between terminals 17 and 18 is the difference in the negative potential of terminals 17 and 18. When the input signal $e_i$ is zero, the negative potential of terminal 17 is equal to the negative potential of terminal 18. Thus, there is no voltage differential between said terminals and the output voltage $e_o$ is zero. However, since neither terminal 17 nor 18 is at ground potential, the output voltage $e_o$ is not taken with respect to ground.

Referring to Fig. 2, it will be seen that as the signal $e_i$ is impressed on the primary winding 6 of the input transformer 6a, the voltage on the control electrode 8a of tube 8 increases positively as shown by curve 23, while the control electrode 9a of tube 9 becomes negative according to curve 24. The voltage 23 causes the anode current of device 8 to increase above the anode current 20 with zero input signal. Similarly, the anode current of device 9 decreases in magnitude from its value with zero input signal as shown in curve 22. Thus, the direct current component of the voltage across resistances 10 is larger than the direct current component of voltage across resistance 14. Terminal 17 is more negative than terminal 18 with respect to ground, and hence the output voltage $e_o$ is equal to this voltage difference. When the input voltage $e_i$ is 180° out of phase with the reference voltage, terminal 18 will be more negative than terminal 17. Thus, the direct current output voltage $e_o$ when taken with respect to terminal 18 will be positive, while with the input and reference voltages in phase, the voltage with respect to terminal 18 is negative.

In the circuit of Fig. 3, however, when the input voltage $e_i$ is zero, resistance 27 is chosen so the voltage drop therein is equal in magnitude to the direct current electromotive force 28, thus the output voltage $e_o$ is zero with respect to ground. When the input voltage $e_i$ is in phase with the reference voltage, the pulsating plate current of device 16 increases with the input voltage $e_i$. This results in an increased voltage drop across resistance 27, and the output voltage $e_o$ becomes positive with respect to ground. When magnitude of input voltage is constant, capacitor 29 filters out the alternating component of the voltage drop across resistance 27, leaving only the direct current component as the output voltage $e_o$. However, since the direct current component of voltage increases with an increase in magnitude of the signal voltage, the direct current output voltage $e_o$ increases with the signal voltage $e_i$. When the input voltage is 180° out of phase with the reference voltage, the pulsating plate current decreases with the input signal $e_i$, thus decreasing the direct current voltage drop across resistance 27, and the output voltage is negative with respect to ground.

In Fig. 4, however, changes in the direct current voltage creates an alternating component which is by-passed to ground through the grid resistor 30 and capacitor 31 which still further increases or decreases the voltage on the control electrode 26a. The voltage drop across the grid resistance 30 depends on the impedance of the feed back resistance 30 and the impedance of the capacitor 31. By proper selection of magnitude of resistance 30 and capacitance 31, the gain of the circuit may be controlled.

In particular applications, where the use of transformers is not desirable, the circuit of Fig. 6, which shows a variation of the circuit illustrated in Fig. 5, enables the introduction of the input voltage $e_i$ to the grid of tube 26 without the use of a transformer and feedback resistance 30 and capacitance 31 perform the same functions as in the circuit of Fig. 4. However, the values of resistance 30 and capacitance 31 are limited since they must always be of a suitable size for transmission of the input voltage $e_1$ to the control electrode $26a$ of tube $26$. In practice, this sometimes means that the gain for rapidly changing input voltages is less than desired. For such cases, the circuit of Fig. 6 may be used. The resistance $30$ in such case can be very small or zero (except for the internal resistance of the choke) without preventing proper transmission of the input voltage $e_1$ to the grid of the tube $26$.

While the present invention has been described by reference to particular embodiments thereof, it will be understood that numerous modifications may be made by those skilled in the art without actually departing from the invention. I, therefore, aim in the appended claims to cover all such equivalent variations as come within the true spirit and scope of the foregoing disclosure.

What I claim as new and desire to secure by Letters Patent of the United States is:

1. In combination, a discriminator circuit comprising an electron discharge device having an anode, a cathode, and a control electrode, an energizing circuit for said device comprising a source of alternating voltage electrically connected between said anode and ground, a load resistance and source of direct current voltage connected in series between said cathode and ground, a capacitor electrically connected in parallel with said series arrangement of load resistance and direct current voltage source, and a signal input circuit for said device electrically connected to said control electrode.

2. In combination, a discriminator circuit, an electron discharge device having an anode, a cathode, and a control electrode, an energizing circuit for said device comprising a source of alternating voltage electrically connected between said anode and ground, a load resistance and a source of direct current voltage connected in series between said cathode and ground, a first capacitor electrically connected in parallel with said series arrangement of load resistance and direct current voltage source, and a signal input circuit for said device electrically connected to said control electrode and comprising a transformer provided with primary and secondary windings, a feedback resistance, and a second capacitor, said secondary winding being connected between said control electrode and one terminal of said feedback resistance, said feedback resistance having its other terminal connected to the ungrounded common terminal of said series arrangement of load resistor and direct current electromotive force and said first capacitor, said second capacitor being connected between ground and common terminal of said secondary winding and said feedback resistor.

3. In combination a discriminator circuit, an electron discharge device provided with an anode, a cathode, and a control electrode, an energizing circuit for said device comprising a source of alternating voltage electrically connected between said anode and ground, a load resistance and a source of direct current voltage connected in series between said cathode and ground, a first capacitor electrically connected in parallel with said series arrangement of load resistance and direct current voltage source, and a signal input circuit for said device electrically connected to said control electrode and comprising a feedback resistance and a second capacitor, said feedback resistance being connected between said control electrode and the ungrounded common connection of said first capacitance and said series combination of load resistance and direct current voltage source, and said second capacitor being connected between the control electrode and the ungrounded terminal of an input voltage.

4. In an electrical circuit, an electron discharge device having an anode, a cathode, and a control electrode, an energizing circuit for said device comprising a source of alternating voltage electrically connected between said anode and ground, a load resistance and a source of direct current voltage connected in series between said cathode and ground, a first capacitor electrically connected in parallel with said series arrangement of load resistance and direct current voltage source, and a signal circuit for said device electrically connected to said control electrode and comprising a feedback resistance, a choke, and a second capacitor, said choke and said feedback resistance being connected in series between said control electrode and the ungrounded common connection of said series combination of load resistance and direct current voltage source and said first capacitor, said second capacitor being connected between the control electrode of said device and a source of input voltage.

ARTHUR P. ADAMSON.

REFERENCES CITED

The following references are of record in the file of this patent:

UNITED STATES PATENTS

| Number | Name | Date |
| --- | --- | --- |
| 2,217,477 | Gulliksen | Oct. 8, 1940 |
| 2,223,840 | Wolff | Dec. 3, 1940 |
| 2,296,091 | Crosby | Sept. 15, 1942 |